United States Patent [19]

Nebelung

[11] Patent Number: 4,770,687
[45] Date of Patent: Sep. 13, 1988

[54] GLASS MOULDING APPARATUS

[75] Inventor: Hermann H. Nebelung, Winsen, Fed. Rep. of Germany

[73] Assignee: Emhart Industries, Inc., Farmington, Conn.

[21] Appl. No.: 94,342

[22] Filed: Sep. 4, 1987

[30] Foreign Application Priority Data

Sep. 9, 1986 [GB] United Kingdom ............ 8621683

[51] Int. Cl.⁴ ............................................ C03B 9/353
[52] U.S. Cl. .................................... 65/360; 65/357
[58] Field of Search ............... 65/261, 305, 357, 360

[56] References Cited

U.S. PATENT DOCUMENTS 3,967,946 7/1976 Campbell et al. ............. 65/260 X
4,585,469 4/1986 Nebelung ..................... 65/172 X Primary Examiner—Arthur Kellogg
Attorney, Agent, or Firm—Spencer T. Smith

[57] ABSTRACT

The relatively movable mould side portions (22, 26) of a glass moulding apparatus are held together during moulding by clamping means (40,42). The clamping means (40,42) comprises first (40) and second (42) pressing means each movable upwardly into an operative position thereof and downwardly into an out-of-the-way position thereof. In their operative positions, each pressing means (40,42) is operative to press one of the mould portions (22,26) towards a mould portion (22,26) which mates therewith. In their out-of-the-way positions, each pressing means (40,42) is clear of the path of movement taken by the mould portions (22,26) in opening and closing the mould.

7 Claims, 4 Drawing Sheets

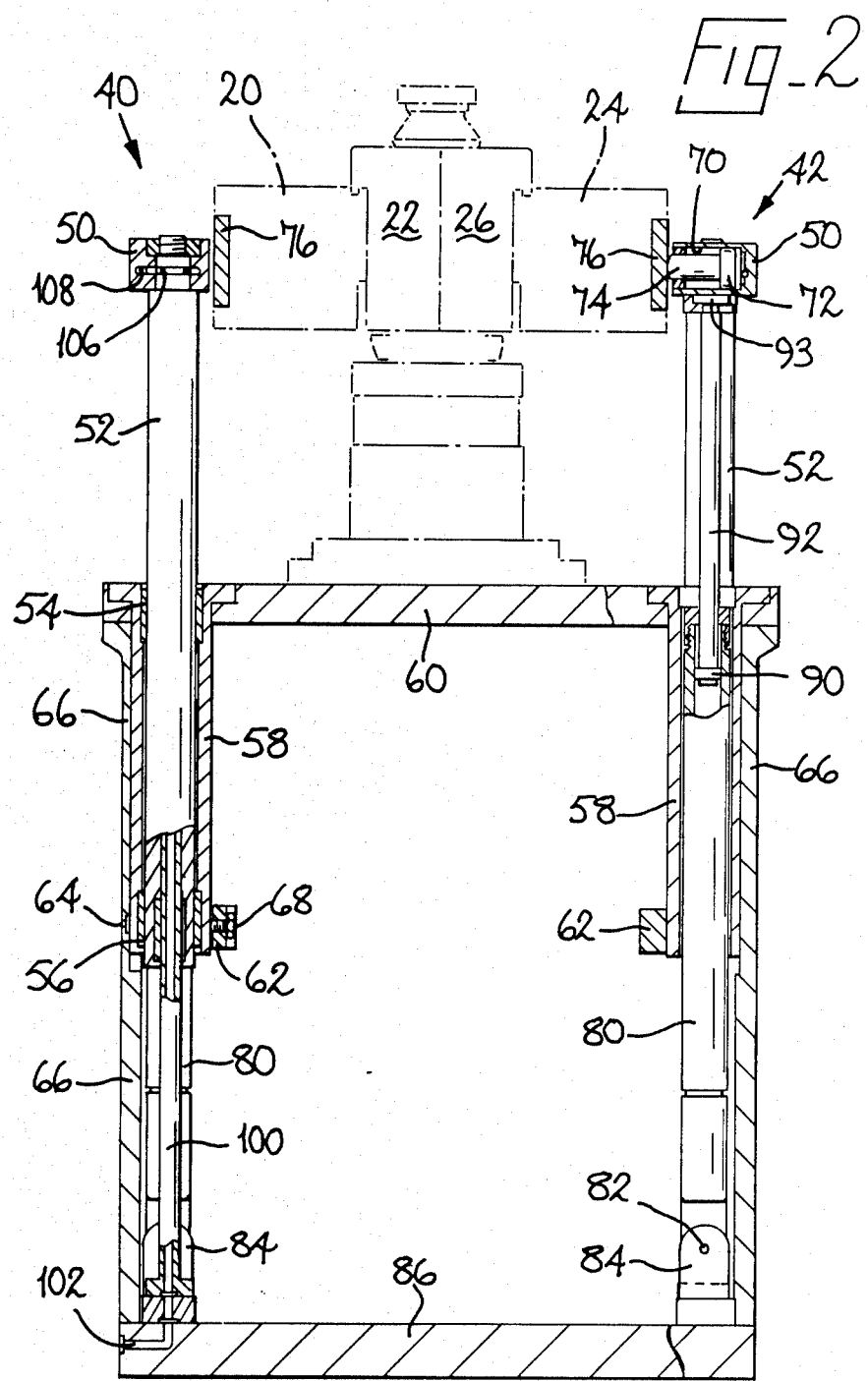
Fig_2

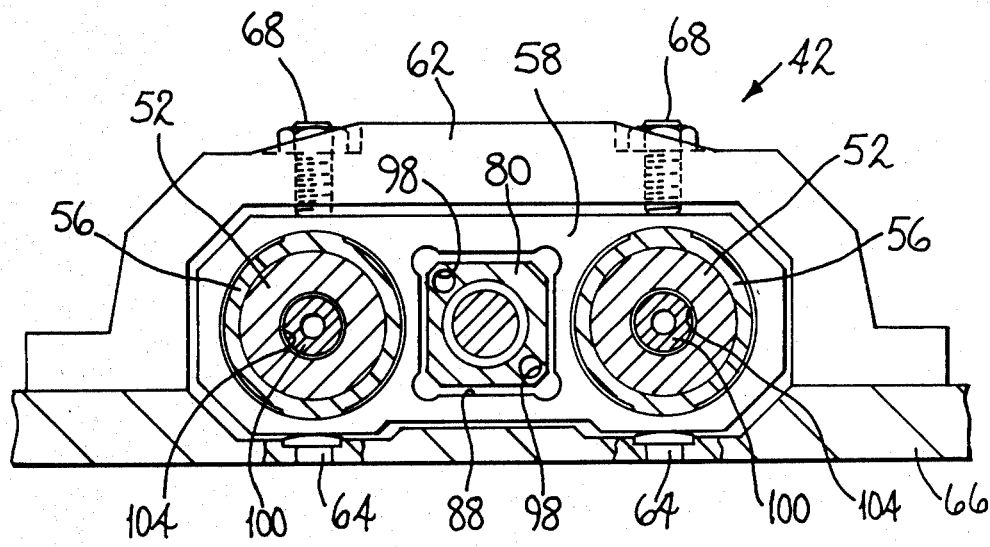
Fig_3

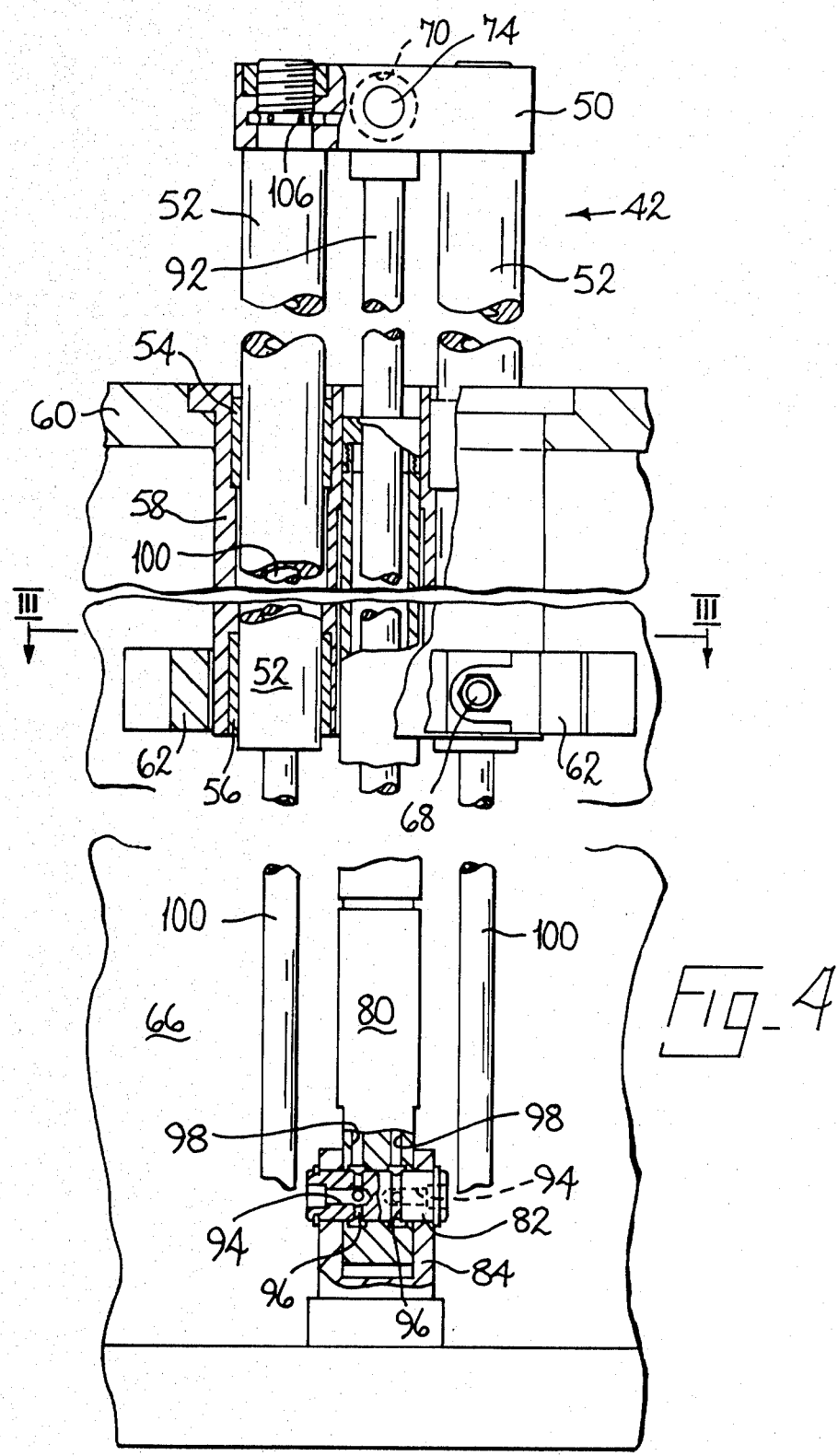
Fig_4

GLASS MOULDING APPARATUS

BACKGROUND OF THE INVENTION

This invention is concerned with glass moulding apparatus comprising a first support arranged to support one or more mould portions, a second support arranged to support an equal number of mould portions as the first support, and mould opening and closing means operable to move the supports towards one another into closed positions thereof, in which each mould portion on each support engages a mould portion supported on the other support and cooperates in defining a mould cavity in which molten glass can be moulded, the mould opening and closing means also beign operable to move the supports away from one another into open positions thereof so that the mould portions are separated to allow moulded glass to be removed from the mould cavity. Such glass moulding apparatus is used in glassware forming machines particularly glassware forming machines of the Individual Section, or I.S., type.

A glassware forming machine of the I.S. type has a plurality of sections each of which operates to mould molten gobs of glass into completed glass containers. The sections are arranged to receive gobs from a common source and operate cyclically with phase differences between the various sections. Each section has a blank station at which gobs are moulded into an intermediate shape, known as a parison, and a finish station at which parisons moulded at the blank station are moulded into completed containers. A section has glass moulding apparatus as described above at its blank station to provide a mould cavity in which parisons are moulded and at its finish station to provide a mould cavity in which containers are moulded. In conventional glass moulding apparatus, the first and second supports are provided by arms that are either pivotally mounted on a common vertical pivot pin or, in the A.I.S. type of machine, are linearly movable on guide rods. One, two, three or four mould side portions are hung on each arm to cooperate with side portions on the other arm in forming mould cavities. The mould opening and closing means comprises a pneumatic or hydraulic piston and cylinder assembly acting through a system of links to pivot the arms in opposite directions about the pivot pin or, in the A.I.S. type of machine, to move the supports along the guide rods.

In the above-described conventional glass moulding apparatus, the mould portions are held in their engaged position by the action of the pneumatic piston and cylinder assembly. However, this assembly is unable in some cases to apply sufficient pressure to prevent the mould portions forming a cavity from separating slightly with a consequent detrimental effect on the parison or container being moulded. For example, when containers are being moulded by the press-blow process in which the parison is mouldedby a pressing operation at the blank station and the parison is blown into a container at the finish station, the gob of molten glass is introduced into the mould cavity at the blank station and a plunger is pushed into the cavity to press the glass into conformity with the shape of the cavity. The force with which the plunger is pushed into the mould cavity has to be sufficient for good moulding but tends to force the mould portions apart causing "seams" to be formed in the parison along the contact-line of the mould portions. As an example, in the production of beer bottles on a conventional I.S. machine with three moulds at each station of each section (a triple-gob process) using the press-blow process with a 0.79 inch (20 mm) diameter plunger, the pressure applied to each plunger would be approximately 15 lbf/sq.in (100 kPa) which causes a force along the centre-line of the centre mould of approximately 3370 lbf (15 kN) tending to force the supports apart. The mould opening and closing means can apply only about 2700 lbf (12 kN) but this is assisted by the effects of bearing play, deflection of the arms and torsional deflection of the linkage. The result is that the mould portions are not firmly held together.

The problem of holding the mould portions firmly together has been recognised and attempts made to solve it. U.S. Pat. Nos. 4,375,979 and 3,528,796 and GB Patent Specification No. 1207669 describe various proposals for solving this problem but these proposals are inefficient as they involve applying clamping forces which are not aligned with the mould portions.

It is an object of the present invention to provide a glass moulding apparatus in which a clamping force aligned with the mould portions can be applied to hold the mould portions in their closed positions.

BRIEF DESCRIPTION OF THE INVENTION

The invention provides glass moulding apparatus comprising a first support arranged to support one or more mould portions, a second support arranged to support an equal number of mould portions as the first support, and mould openign and closing means operable to move the supports toward one another into closed positions thereof, in which each mould portion on each support engages a mould portion supported by the other support and cooperates therewith in defining a mould cavity in which molten glass can be moulded, the mould opening and closing means also being operable to move the supports away from one another into open positions thereof so that the mould portions are separated to allow moulded glass to be removed from the mould cavity, wherein the apparatus also comprises clamping means operable to apply clamping forces acting to prevent separation of the engaged mould portions while glass is moulded in the mould cavity, the clamping means comprising first and second pressing means each movable upwardly into an operative position thereof and downwardly into an out-of-the-way position thereof, the first pressing means being operable in its operative position to press the first support towards the second support, and in its out-of-the-way position being clear of the path of movement of the first support between its closed and open positions, the second pressing means being operable in its operative position to press the second support towards the first support, and in its out-of-the-way position being clear of the path of movement of the second support between its closed and open positions, and moving means operable in timed relationship with the operation of the mould opening and closing means to move the first and the second pressing means into their operative positions when the supports are in their closed positions and to move the first and the second pressing means into their out-of-the-way positions to allow the supports to move between their closed and open positions.

In a glass moulding apparatus as described in the last preceding paragraph, the clamping force can be applied in alignment with the mould portions, i.e. on the centre line of a single mould or the centre mould of three or half-way between two moulds or the centre two of four moulds. Furthermore, the clamping forces act in opposite directions and hence oppose one another. Also less arm deflection and no bearing play phenomena are involved.

In order to transmit reaction forces caused by operation of the clamping means to a supporting frame, preferably the supporting frame of a section of an I.S. glassware forming machine, each pressing means may comprise at least one guide rod mounted on a supporting frame for vertical sliding movement as the pressing means moves between its operative and out-of-the-way positions and arranged to transmit reaction forces to the frame. The guide rods may be slidably mounted in retainers each of which is supported by a horizontal member of the supporting frame and braced against horizontal deflection by at least one set screw mounted on a bracket projecting from a vertical member of the supporting frame. In order to protect the supply of fluid under pressure to the pressing means, each guide rod may have a passage therethrough in which a pipe for supplying fluid under pressure to the pressing means is telescopically received.

Preferably, each pressing means comprises a horizontally-disposed hydraulic piston and cylinder assembly operable to press a piston rod against a plate of the associated support when the pressing means is in its operative position.

Conveniently, the moving means comprises two vertically-disposed piston and cylinder assemblies, one associated with each of the pressing means, each piston and cylinder assembly being mounted on a supporting frame and operable to move its associated pressing means vertically relative to the frame. The frame is preferably the supporting frame of a section of an I.S. glassware forming machine.

In order to avoid lateral loading of the vertically disposed piston and cylinder assemblies, preferably, the vertically-disposed piston and cylinder assemblies are pivotally mounted on the frame and each comprises a piston rod connected to the associated pressing means by a connection which allows horizontal float between the piston rod and the pressing means.

BRIEF DESCRIPTION OF THE DRAWINGS

There now follows a detailed description, to be read with reference to the accompanying drawings, of a glass moulding apparatus which is illustrative of the invention. It is to be understood that the illustrative apparatus has been selected for description by way of example and not of limitation of the invention.

In the drawings:

FIG. 2 is a vertical cross-sectional view taken on the line II—II in a FIG. 1;

FIG. 3 is a horizontal cross-sectional view through a portion of the illustrative apparatus, the direction of view being indicated by the line III—III in FIG. 4; and FIG. 4 is an elevational view, partly in section, taken in the direction of the arrow IV in FIG. 1.

DETAILED DESCRIPTION OF PREFERRED EMBODIMENT OF THE INVENTION

Figure 1:
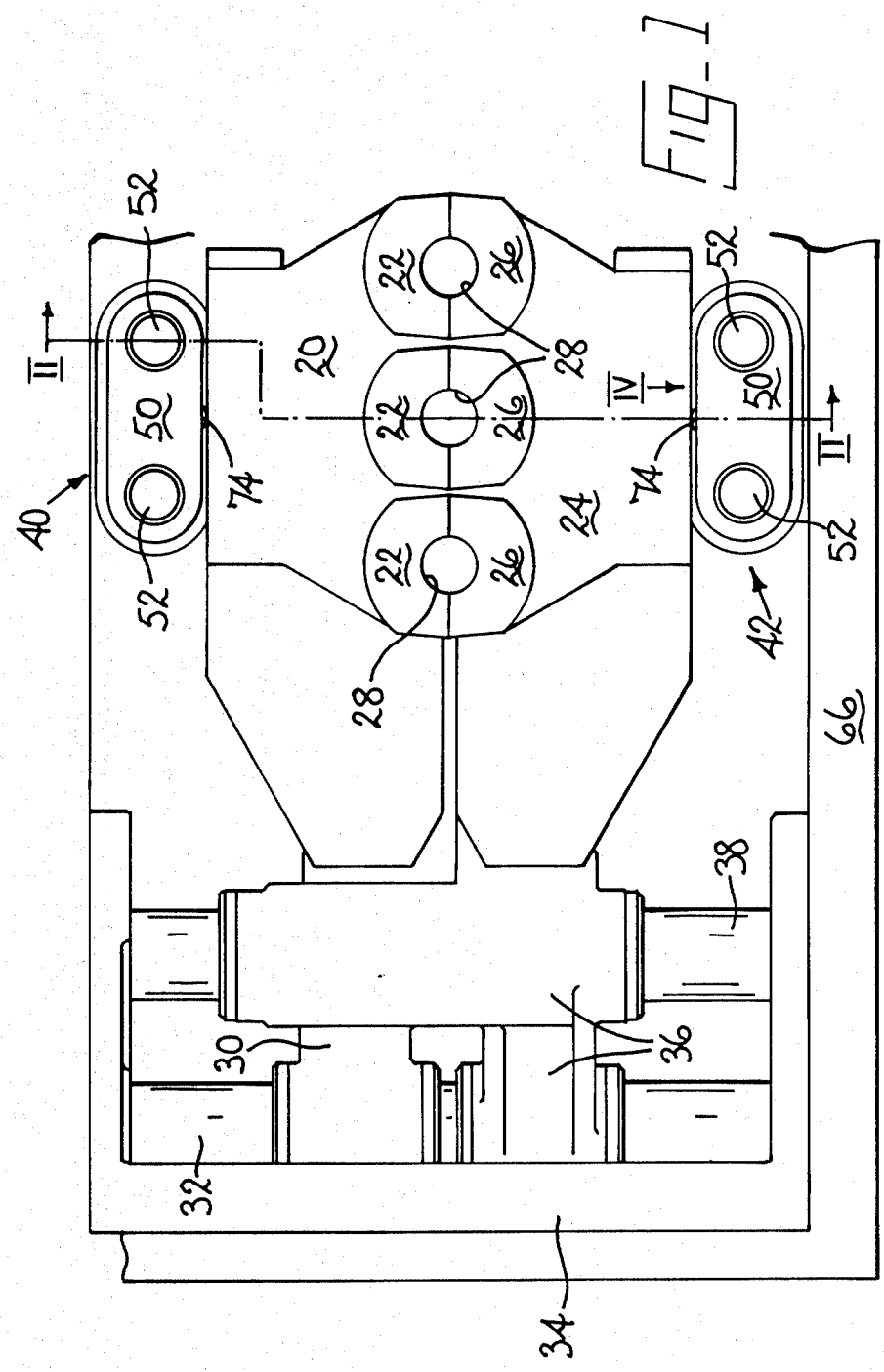
FIG. 1 is a plan view of the illustrative apparatus which is constructed as the blank moulding station of an I.S. glassware forming machine of the A.I.S. type.

The illustrative glass moulding apparatus forms part of a section of a glassware forming machine of the individual section type. The particular type of machine is known as the A.I.S. type in which the moulds move linearly, rather than arcuately, and is described in more detail in U.S. Pat. No. 4,009,018.

FIG. 1 shows a plan view of the blank side of the section and is similar to FIG. 1A of said U.S. patent specification except that the moulds are shown closed instead of open, three moulds are shown instead of two, and the neck ring hub mechanism is omitted.

The apparatus comprises a first support 20 arranged to support one or more mould portions 22, in this case three are shown, a second support 24 arranged to support an equal number of mould portions 26 as the first support 20, and mould opening and closing means operable to move the supports 20 and 24 towards one another into closed positions thereof. In the closed position which is shown in FIG. 1, each mould portion 22 and 26 engages a mould portion supported by the other support and cooperates therewith in defining a mould cavity with an upwardly facing opening 28 into which gobs of molten glass can be received for moulding in the mould cavity. The mould opening and closing means is also operable to move the supports 20 and 24 away from one another into open positions thereof so that the mould portions 22 are separated from the mould portions 26 to allow moulded glass to be removed from the mould cavities.

The support 20 is similar in construction to the mould holder structure described in U.S. Pat. No. 4,009,018 with reference number 200. The support 20 is attached to a bracket 30 which is slidably received on a fixed guide rod 32 extending transversely of the section. This guide rod 32 is mounted on a U-shaped bracket 34 of a fixed frame of the section. The support 24 is similar in construction to the right hand mould holder arm described in U.S. Pat. No. 4,009,018 with reference number 202. The support 24 is attached to a bracket 36 which is slidably received on the fixed guide rod 32.

The bracket 34 has two further fixed guide rods 38 mounted thereon one above the other (only the upper rod 38 is visible in FIG. 1). The rods 32 and 38 are arranged in a triangular pattern as shown in FIG. 2A of U.S. Pat. No. 4,009,018. The bracket 30 is also slidably received on the lower rod 38 while the bracket 36 is slidably received on the upper rod 38.

The mould opening and closing means is not shown in the drawings but is similar to that described in U.S. Pat. No. 4,009,018 in relation to FIG. 10 thereof. The mould opening and closing means is operable to slide the supports 20 and 24 along the rods 32 and 38 towards or away from one another.

The illustrative apparatus also comprises clamping means operable to apply clamping forces acting to prevent separation of the engaged mould portions 22 and 26 while glass is moulded in the mould cavities defined thereby. The clamping means comprises first pressing means 40 cooperating with the support 20 and second pressing means 42 cooperating with the support 24. As the first 40 and the second 42 pressing means are of identical construction, only the second pressing means 42 is described hereinafter in detail, like parts of the two pressing means 40 and 42 being indicated by the same reference numerals in the drawings.

The second pressing means 42 comprises a crosshead 50 mounted on top of two guide columns 52 and extending between them (see FIG. 4). The guide columns 52 extend vertically downwardly from the crosshead 50 and each passes downwardly through two circumferentially relieved guide bushes 54 and 56 one above the other. The bushes 54 and 56 are supported by a retainer 58 which is mounted on a horizontal frame member 60 of the supporting frame of the section. The columns 52 can slide vertically through the bushes 54 and 56. Thus, the second pressing means 42 comprises two guide rods 52 which are mounted on the supporting frame for vertical sliding movement. This vertical sliding movement, as will appear from the description below, occurs as the second pressing means moves between operative and out-of-the-way positions thereof. The guide rods 52 are arranged to transmit reaction forces to the supporting frames.

The retainer 58 is held at its bottom end by a bracket 62 (see FIG. 3) between two studs 64 set into a vertical side member 66 of the supporting frame of the section and two set screws 68 carried by the bracket 62. The set screws 68 brace the retainer against horizontal deflection. The bracket 64 projects from the side member 66. The retainer 58 provides a rigid mounting preventing horizontal deflection of the crosshead 50 by pivotal movement of the columns 52. Forces tending to pivot the columns 52 are transmitted to the side member 66.

The crosshead 50 defines a cylinder 70 (see FIG. 2) of a horizontally-disposed hydraulic piston and cylinder assembly of the second pressing means 42. The cylinder 70 is arranged between the guide columns 52 with its longitudinal axis horizontal. The assembly also comprises a piston 72 movable in the cylinder 70 when hydraulic fluid under pressure is introduced into the cylinder 70 and a piston rod 74 projecting from the piston 72 towards the centre of the section. As described in detail below, the second pressing means 42 is movable upwardly into an operative position thereof (shown in the drawings) and downwardly into an out-of-the-way position thereof. The second pressing means 42 is operable in its operative position to press the second support 24 towards the first support 20. This is accomplished by operation of the piston and cylinder assembly 70, 72 to cause the piston rod 74 to press against a plate 76 of the support 24 (see FIG. 1). The first pressing means 40 operates in identical manner to the second pressing means 42 but in relation to the first support 20.

The illustrative apparatus also comprises moving means operable, in timed relationship with the operation of the mould opening and closing means, to move the first 40 and the second 42 pressing means into their operative positions when the supports 20 and 24 are in their closed positions and to move the first 40 and second 42 pressing means into their out-of-the-way positions to allow the supports 20 and 24 to move between their closed and open positions. The moving means comprises two vertically-disposed piston and cylinder assemblies of which a first is associated with the first pressing means 40 and a second is associated with the second pressing means 42. As these two assemblies are identical in construction and operation, only the second thereof is described in detail hereinafter, like parts of the two assemblies being given the same reference numeral in the drawings.

The second piston and cylinder assembly comprises a cylinder 80 extending vertically below the crosshead 50 of the second pressing means 42 and pivotally mounted at its lower end on a pin 82 (FIG. 1) mounted on a bracket 84 which extends upwardly from a base plate 86 of the section supporting frame. The cylinder 80 extends through a hole 88 in the retainer 58 (FIG. 3). The second piston and cylinder assembly also comprises a piston 90 which is movable in the cylinder 80 upon the introduction of hydraulic fluid under pressure into the cylinder 80. The assembly also comprises a piston rod 92 projecting upwardly from the piston 90. At its upper end the piston rod 92 has a head 93 (FIG. 2) which is received in a horseshoe-shaped slot in the crosshead 50 so that the head 93 can float horizontally relative to the crosshead 50. This float prevents lateral loading of the piston rod 92 and is accommodated by the pivotal mounting of the cylinder 80 on the pin 82. Operation of the assembly 80,90 causes the second pressing means to move between its operative and out-of-the-way positions.

The cylinder 80 is supplied with hydraulic fluid under pressure through connections to the pin 82 (see FIG. 4). Pipe connections (not shown) are connected to axial bores 94 extending into opposite ends of the pin 82. These bores 94 connect through radial bores 96 with passages 98 extending in the wall of the cylinder 80 to enter the cylinder on opposite sides of the piston 90.

The cylinder 70 is supplied with hydraulic fluid through two pipes 100 which extend vertically upward from the base plate 86. Each pipe 100 communicates with a passage 102 formed in the base plate which is connectable to a pump or to tank. Each pipe 100 is telescopically-received in a vertical passage 104 extending through one of the guide columns 52 (FIG. 3). Hydraulic fluid entering the passage 102 passes upwardly through the pipe 100 and the passage 104 into the crosshead 50 where it passes through radial passages 106 in the column 52 into a passage 108 in the crosshead 50 which enters the cylinder 70. The two pipes 100 associated with the second pressing means 42 supply passages 108 which enter the cylinder 70 on opposite sides of the piston 72.

In the operation of the illustrative apparatus, when the supports 20 and 24 are in their closed positions, the cylinders 80 are supplied simultaneously with hydraulic fluid under pressure so that the two crossheads 50 are raised level with the plates 76 (as shown in FIG. 2). As this motion takes place the pistons 72 are fully retracted into the cylinders 70. The cylinders 70 are then supplied with hydraulic fluid under pressure so that the pistons 72 move towards the centre of the section bringing the piston rods 74 into pressing engagement with the plates 76 of the supports 20 and 24. As can be seen from FIG. 1, the pressing means 40 and 42 apply forces from opposite directions along the centre-line of the centre mould 22,26. When the moulding operation in the mould cavities has been completed, the cylinders 70 are supplied with hydraulic fluid under pressure so that the piston rods 74 are withdrawn from the plates 76 and then the cylinders 80 are supplied with hydraulic fluid under pressure so that the crossheads 50 are moved downwardly to their out-of-the-way positions. When the crossheads 50 are clear of the path of movement of the supports 20 and 24, the supports move to their open positions to allow removal of the moulded glass and then return to their closed positions.

I claim:

1. Glass moulding apparatus comprising a first support arranged to support one or more mould portions, a second support arranged to support an equal number of mould portions as the first support, and mould opening and closing means operable to move the supports towards one another into closed positions thereof, in which each mould portion on each support engages a mould portion supported by the other support and cooperates therewith in defining a mould cavity in which molten glass can be moulded, the mould opening and closing means also being operable to move the supports away from one another into open positions thereof so that the mould portions are separated to allow moulded glass to be removed from the mould cavity, wherein the apparatus also comprises clamping means operable to apply clamping forces acting to prevent separation of the engaged mould portions while glass is moulded in the mould cavity, the clamping means comprising first and second pressig means each movable upwardly into an operative position thereof and downwardly into an out-of-the-way position thereof, the first pressing means being operable in its operative position to press the first support towards the second support, and in its out-of-the-way position being clear of the path of movement of the first support between its closed and open positions, the second pressing means being operable in its operative position to press the second support towards the first support, and in its out-of-the-way position being clear of the path of movement of the second support between its closed and open positions, and moving means operable in timed relationship with the operation of the mould opening and closing means to move the first and the second pressing means into their operative positions when the supports are in their closed positions and to move the first and the second pressing means into their out-of-the-way positions to allow the supports to move between their closed and open positions.

2. Glass moulding apparatus according to claim 1, wherein each pressing means comprises at least one guide rod mounted on a supporting frame for vertical sliding movement as the pressing means moves between its operative and out-of-the-way positions and arranged to transmit reaction forces to the frame.

3. Glass moulding apparatus according to claim 2, wherein the guide rods are slidably mounted in retainers each of which is supported by a horizontal member of the supporting frame and braced against horizontal deflections by at least one set screw mounted on a bracket projecting from a vertical member of the supporting frame.

4. Glass moulding apparatus according to claim 2, wherein each guide rod has a passage therethrough in which a pipe for supplying fluid under pressure to the pressing means is telescopically received.

5. Glass moulding apparatus according to claim 1, wherein each pressing means comprises a horizontally-disposed hydraulic piston and cylinder assembly operable to press a piston rod against a plate of the associated support when the pressing means is in its operative position.

6. Glass moulding apparatus according to claim 1, wherein the moving means comprises two vertically-disposed piston and cylinder assemblies, one associated with each of the pressing means, each piston and cylinder assembly being mounted on a supporting frame and operable to move its associated pressing means vertically relative to the frame.

7. Glass moulding apparatus according to claim 6, wherein the vertically-disposed piston and cylinder assemblies are pivotally mounted on the frame and each comprises a piston rod connected to the associated pressing means by a connection which allows horizontal float between the piston rod and the pressing means.

* * * * *